(12) United States Patent
Sasaki et al.

(10) Patent No.: US 11,760,522 B2
(45) Date of Patent: Sep. 19, 2023

(54) BAG-MAKING AND PACKAGING MACHINE

(71) Applicant: ISHIDA CO., LTD., Kyoto (JP)

(72) Inventors: Ryo Sasaki, Ritto (JP); Makoto Ichikawa, Ritto (JP); Satoshi Hashimoto, Ritto (JP); Ryota Nagashima, Ritto (JP); Hiroki Fujihara, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 267 days.

(21) Appl. No.: 17/276,485

(22) PCT Filed: Aug. 1, 2019

(86) PCT No.: PCT/JP2019/030124
§ 371 (c)(1),
(2) Date: Mar. 16, 2021

(87) PCT Pub. No.: WO2020/059312
PCT Pub. Date: Mar. 26, 2020

(65) Prior Publication Data
US 2022/0024623 A1    Jan. 27, 2022

(30) Foreign Application Priority Data
Sep. 18, 2018 (JP) ................... 2018-174197

(51) Int. Cl.
*B29C 65/18* (2006.01)
*B65B 51/30* (2006.01)
(Continued)

(52) U.S. Cl.
CPC ............ *B65B 51/303* (2013.01); *B29C 65/18* (2013.01); *B29C 65/7894* (2013.01);
(Continued)

(58) Field of Classification Search
CPC .............. B65B 51/303; B29C 65/7894; B29C 66/1122; B29C 66/4312; B29C 66/83543; B29C 66/8491
(Continued)

(56) References Cited

U.S. PATENT DOCUMENTS

2018/0346159 A1* 12/2018 Ichikawa ............ B29C 66/4312

FOREIGN PATENT DOCUMENTS

JP    H07-291234 A    11/1995
JP    H09-175514 A    7/1997
(Continued)

OTHER PUBLICATIONS

The Search Report from the corresponding European Patent Application No. 19861416.6 dated Oct. 12, 2021.
(Continued)

*Primary Examiner* — James D Sells
(74) *Attorney, Agent, or Firm* — SHINJYU GLOBAL IP

(57) ABSTRACT

A bag-making and packaging machine includes sealing jaws, a horizontal moving device, a vertical moving device, and a control unit. The sealing jaws perform a transverse sealing operation. The vertical moving device moves the sealing jaws in a vertical direction. The vertical moving device includes a rotating shaft, a motor, and a link mechanism. The link mechanism transmits rotational force of the rotating shaft to the sealing jaws. The control unit performs first control or second control. The first control forwardly rotates and reversely rotates the rotating shaft during a period of time from a start of the transverse sealing operation to a start of a subsequent transverse sealing operation. The second control performs one of the transverse sealing operation and the subsequent transverse sealing operation with a forward rotation of the rotating shaft and the other with a reverse rotation of the rotating shaft.

9 Claims, 8 Drawing Sheets

(51) Int. Cl.
  *B29C 65/78* (2006.01)
  *B29C 65/00* (2006.01)
  *B65B 9/207* (2012.01)
  *B65B 57/00* (2006.01)

(52) U.S. Cl.
  CPC ...... *B29C 66/1122* (2013.01); *B29C 66/4312* (2013.01); *B29C 66/83543* (2013.01); *B29C 66/8491* (2013.01); *B65B 9/207* (2013.01); *B65B 57/00* (2013.01)

(58) Field of Classification Search
  USPC .......................................................... 53/450
  See application file for complete search history.

(56) References Cited

FOREIGN PATENT DOCUMENTS

| | | |
|---|---|---|
| JP | H11-115916 A | 4/1999 |
| JP | 2002-264914 A | 9/2002 |
| JP | 2003-160102 A | 6/2003 |
| JP | 2003-191901 A | 7/2003 |
| JP | 2004-352251 A | 12/2004 |
| JP | 2005-041559 A | 2/2005 |
| JP | 2006-036257 A | 2/2006 |
| JP | 2014-129132 A | 7/2014 |
| WO | 2017/086038 A1 | 5/2017 |
| WO | 2020059312 A | 3/2020 |

OTHER PUBLICATIONS

The Search Report from the corresponding International Patent Application No. PCT/JP2019/030124 dated Oct. 29, 2019.
The Preliminary Report on Patentability (with Written Opinion) from the corresponding International Patent Application No. PCT/JP2019/030124 dated Mar. 23, 2021.
The Submission of Publication from the corresponding Japanese Patent Application No. 2018-174197 filed on Jun. 12, 2020.
Publication No. 7 cited in the Submission of Publication (above 3), Makino, vol. 17 published Oct. 23, 1997.

\* cited by examiner

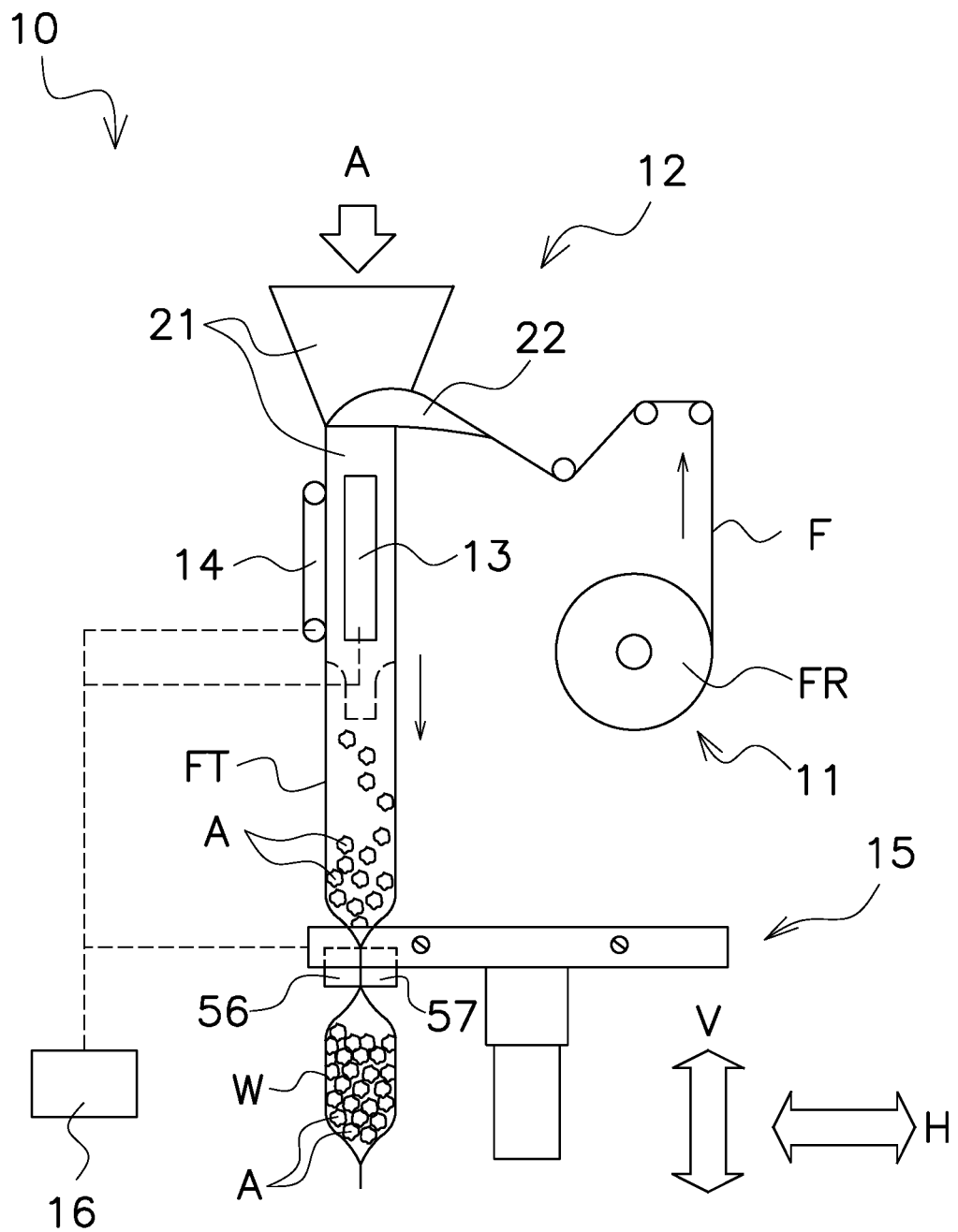
F I G. 1

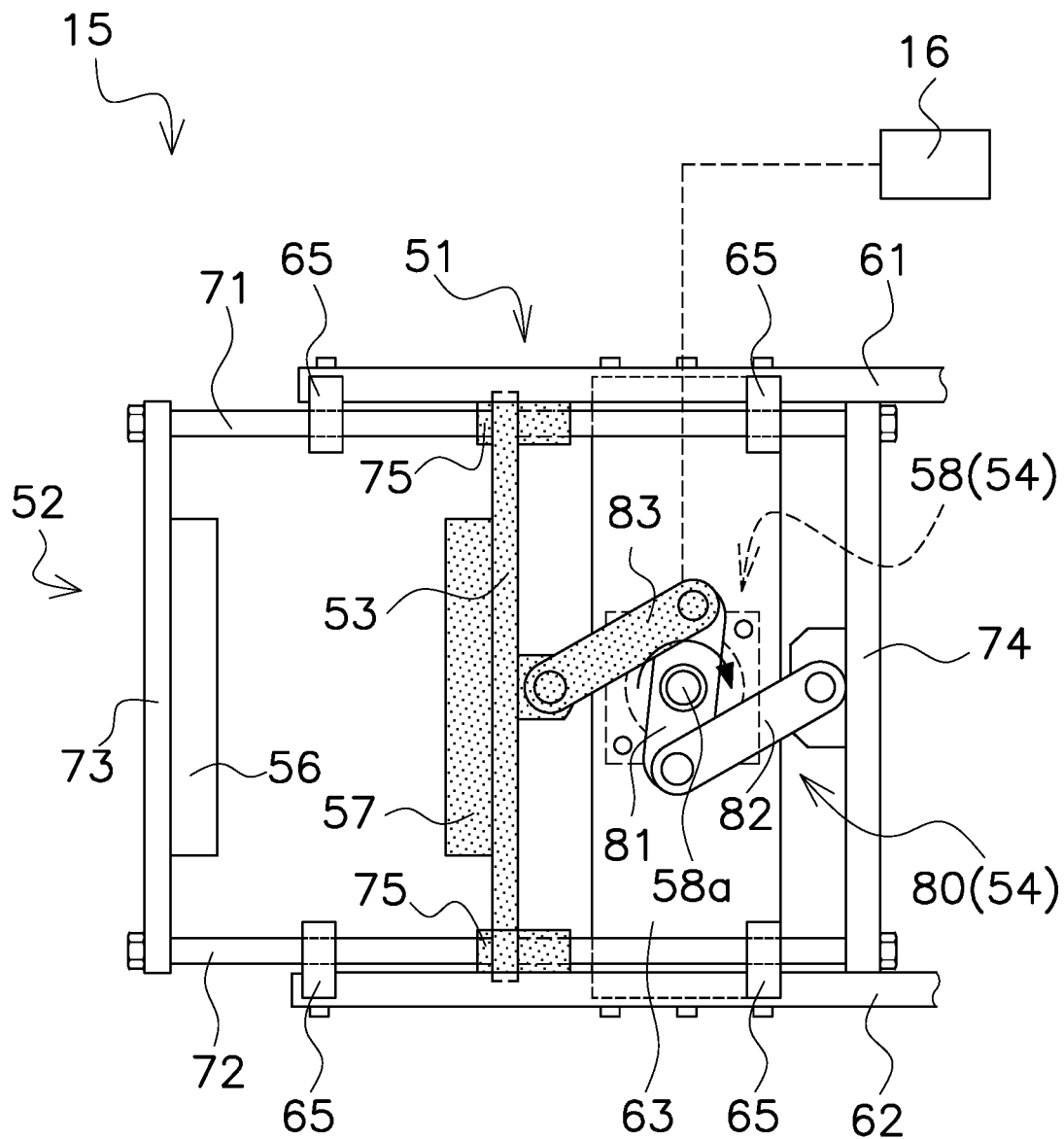
F I G. 3

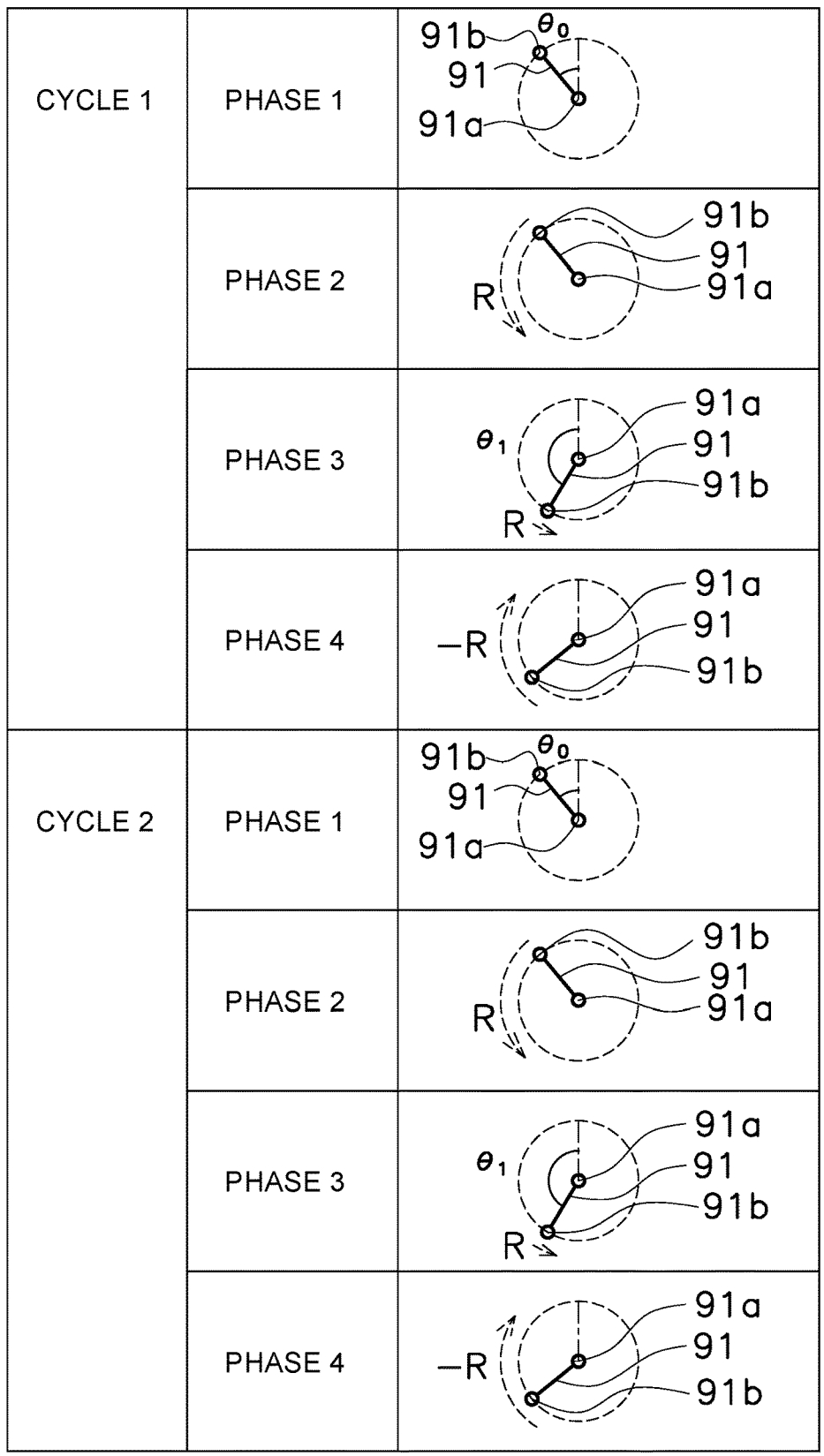
F I G. 8

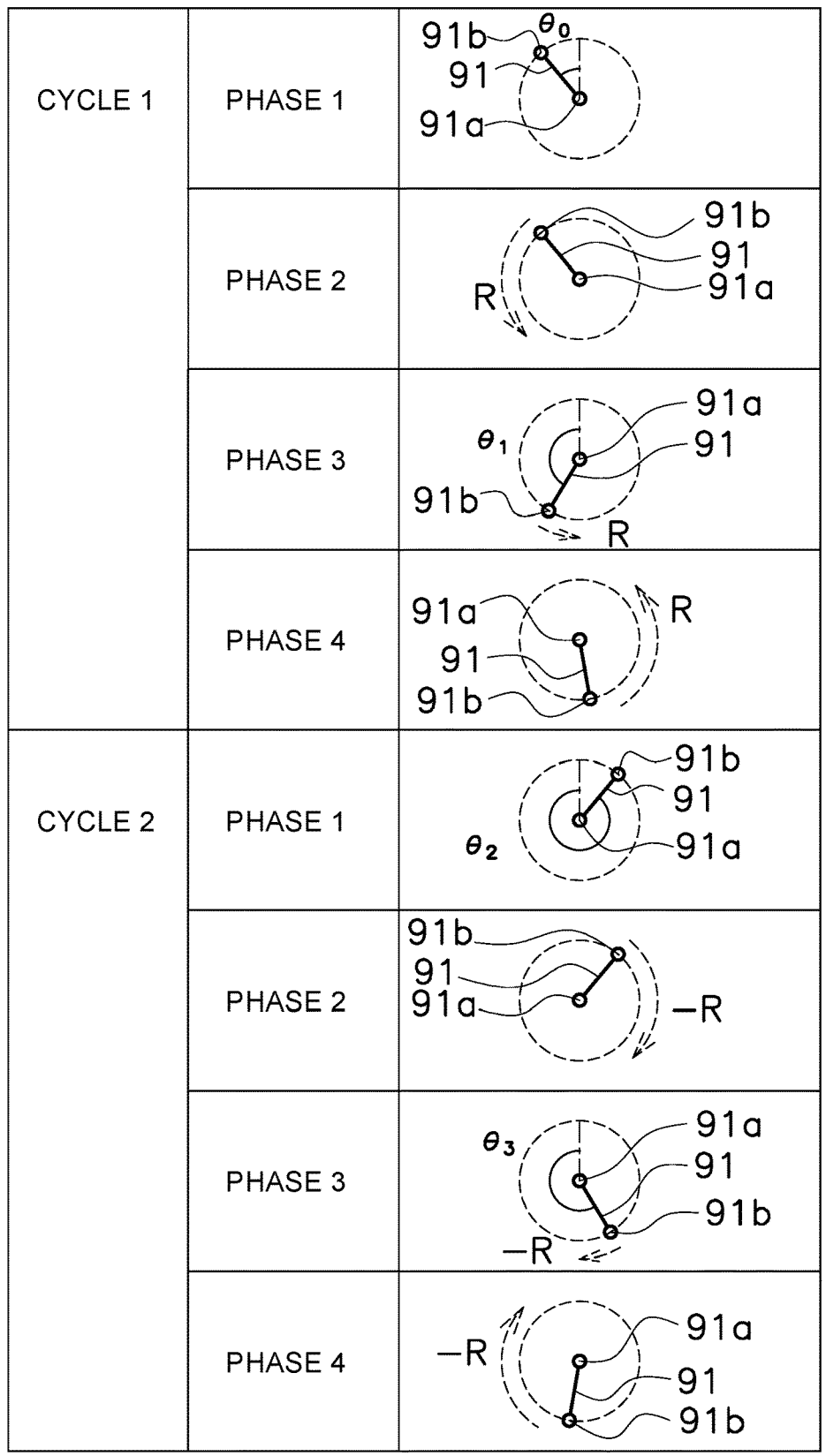
F I G. 9

BAG-MAKING AND PACKAGING MACHINE

This application is the U.S. National Phase of PCT/JP2019/030124, filed Aug. 1, 2019, which claims priority to Japanese Patent Application No. 2018-174197, filed Sep. 18, 2018. Both of those applications are incorporated by reference herein in their entireties.

TECHNICAL FIELD

This disclosure relates to a bag-making and packaging machine.

BACKGROUND ART

The bag-making and packaging machine disclosed in Japanese Patent Application Publication No. JP-A No. 2003-160102 has sealing jaws that perform a transverse sealing operation. The sealing jaws can move in the up and down direction, which is the conveyance direction of a film for packaging. The mechanism that moves the sealing jaws up and down includes a servo motor that rotates in one direction and a link mechanism that converts the rotational force of the servo motor into up and down reciprocal motion and transmits it to the sealing jaws.

BRIEF SUMMARY

Japanese Patent Application Publication No. JP-A No. 2003-160102 contains no description in regard to rotating the servo motor in both forward and reverse directions.

It is a goal of this disclosure to utilize bidirectional rotation of a motor in a bag-making and packaging machine to improve the flexibility of operations that the bag-making and packaging machine executes.

A bag-making and packaging machine pertaining to a first aspect includes sealing jaws, a horizontal moving device, a vertical moving device, and a control unit. The sealing jaws perform a transverse sealing operation. The horizontal moving device moves the sealing jaws in a horizontal direction. The vertical moving device moves the sealing jaws in a vertical direction. The vertical moving device has a rotating shaft, a motor, and a link mechanism. The rotating shaft is capable of forward rotation and reverse rotation. The motor rotates the rotating shaft. The link mechanism transmits rotational force of the rotating shaft to the sealing jaws. The control unit performs first control and second control. The first control forwardly rotates and reversely rotates the rotating shaft during the time from the start of one transverse sealing operation to the start of the subsequent transverse sealing operation. The second control performs one of one transverse sealing operation and the subsequent transverse sealing operation with a forward rotation of the rotating shaft and the other with a reverse rotation of the rotating shaft.

According to this configuration, the control unit can perform the first control and the second control. Consequently, there is greater flexibility in the operations that the bag-making and packaging machine executes.

A bag-making and packaging machine pertaining to a second aspect is the bag-making and packaging machine pertaining to the first aspect, wherein the link mechanism has a first link and a second link. The first link has a first link length, and has a first link first end coupled to the rotating shaft and a first link second end coupled to the second link. The second link has a second link first end coupled to the first link and a second link second end coupled to the sealing jaws or a support body that supports the sealing jaws. The first link second end moves in a region on a circle whose radius is the first link length and which includes a top dead center, a bottom dead center, a first half circle interconnecting the top dead center and the bottom dead center, and a second half circle on the opposite side of the first half circle.

According to this configuration, the link mechanism has the first link and the second link. Consequently, the rotational force of the rotating shaft can be transmitted by the first link and the second link to the sealing jaws.

A bag-making and packaging machine pertaining to a third aspect is the bag-making and packaging machine pertaining to the second aspect, wherein the first link second end at the end of the transverse sealing operation is positioned above the bottom dead center without being positioned at the bottom dead center.

According to this configuration, at the end of the transverse sealing operation, the first link second end is not positioned at the bottom dead center. Consequently, the operation subsequent to the transverse sealing operation can be smoothly started.

A bag-making and packaging machine pertaining to a fourth aspect is the bag-making and packaging machine pertaining to the second aspect or the third aspect, wherein the first link second end at the start of the transverse sealing operation is positioned below the top dead center without being positioned at the top dead center.

According to this configuration, at the start of the transverse sealing operation, the first link second end is not positioned at the top dead center. Consequently, the transverse sealing operation can be smoothly started.

A bag-making and packaging machine pertaining to a fifth aspect is the bag-making and packaging machine pertaining to any one of the second aspect to the fourth aspect, wherein the first link second end at the end of the transverse sealing operation is positioned above the bottom dead center by an amount corresponding to a rotation angle of 30° or more.

According to this configuration, at the start of the transverse sealing operation, the first link second end is positioned above the bottom dead center by an amount corresponding to a rotation angle of 30° or more. Consequently, the sealing jaws can move further downward at the end of the transverse sealing operation, so jamming of the film that is conveyed can be inhibited.

A bag-making and packaging machine pertaining to a sixth aspect is the bag-making and packaging machine pertaining to any one of the second aspect to the fifth aspect, wherein the first link second end at the start of the transverse sealing operation is positioned below the top dead center by an amount corresponding to a rotation angle of 30° or more.

According to this configuration, at the start of the transverse sealing operation, the first link second end is positioned below the top dead center by an amount corresponding to a rotation angle of 30° or more. Consequently, speed in the vertical direction for the sealing jaws to perform a stripping operation can be ensured.

A bag-making and packaging machine pertaining to a seventh aspect is the bag-making and packaging machine pertaining to any one of the second aspect to the sixth aspect, wherein the control unit performs the second control. At the end of the transverse sealing operation the first link second end is positioned in one of the first half circle or the second half circle and thereafter passes through the bottom dead center to move to the other of the first half circle or the second half circle.

According to this configuration, the forward rotation and the reverse rotation of the rotating shaft are each executed once each for every two transverse sealing operations. Consequently, the frequency of switches between the forward rotation and the reverse rotation is small, so the transverse sealing operation can be quickly performed.

A bag-making and packaging machine pertaining to an eighth aspect is the bag-making and packaging machine pertaining to any one of the first aspect to the seventh aspect, wherein after the end of the transverse sealing operation the sealing jaws move downward at least once.

According to this configuration, the first link second end moves downward after the end of the transverse sealing operation. Consequently, jamming of the film that is conveyed can be inhibited.

A bag-making and packaging machine pertaining to a ninth aspect is the bag-making and packaging machine pertaining to any one of the first aspect to the eighth aspect, wherein the control unit selectively performs one of the first control and the second control.

According to this configuration, the control unit is capable of executing both the first control and the second control. Consequently, control flexibility is improved.

According to the bag-making and packaging machine of this disclosure, there is greater flexibility in the operations that the bag-making and packaging machine executes.

BRIEF DESCRIPTION OF THE DRAWINGS

FIG. 1 is a schematic view showing the configuration of a bag-making and packaging machine 10.

FIG. 3 is a plan view showing the transverse sealing device 15.

FIG. 8 is a drawing showing operations under first control.

FIG. 9 is a drawing showing operations under second control.

DETAILED DESCRIPTION

Figure 2:
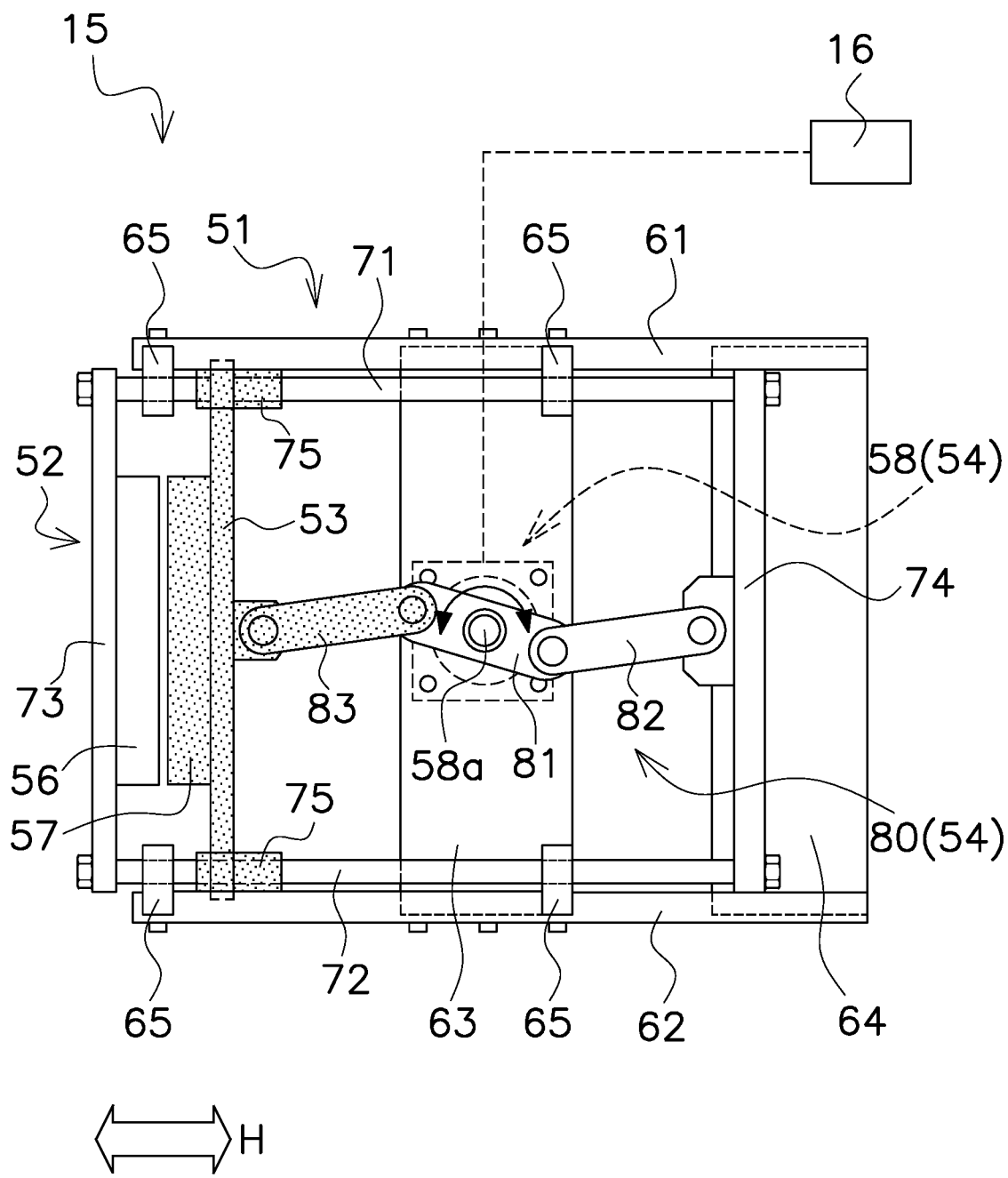
FIG. 2 is a plan view showing a transverse sealing device 15.

An embodiment of the invention will be described below with reference to the drawings. It will be noted that the following embodiment is a specific example of the invention and is not intended to limit the technical scope of the invention.

(1) Overall Configuration

FIG. 1 shows the overall configuration of a bag-making and packaging machine 10. The bag-making and packaging machine 10 makes bags W from a film F and puts articles A inside to package the articles A. The bag-making and packaging machine 10 has a film roll support unit 11, a former 12, pull-down belts 13, a longitudinal sealing device 14, a transverse sealing device 15, and a control unit 16.

(2) Detailed Configuration (2-1) Film Roll Support Unit 11

The film roll support unit 11 supports a film roll FR. The film F pulled out from the film roll support unit 11 heads toward the former 12 via plural rollers.

(2-2) Former 12

The former 12 forms the film F into a tube by bending the film F and overlapping the two longitudinal edges of the film F. The former 12 has a tube 21 and a sailor's collar 22. The tube 21 also functions as a guide path for the articles A. The sailor's collar 22 guides the film F between the sailor's collar 22 and the tube 21 while curving the film F.

(2-3) Pull-Down Belts 13

The pull-down belts 13 are driven by a motor not shown in the drawings to convey the tubular film F downward along the tube 21.

(2-4) Longitudinal Sealing Device 14

The longitudinal sealing device 14 bonds the two parallel edges of the film F extending in the conveyance direction to make a film tube FT. The longitudinal sealing device 14 heats, while applying pressure to, the two edges of the film F overlapping each other on the tube 21. The longitudinal sealing device 14 has a heater and a heater belt, for example.

(2-5) Transverse Sealing Device 15

The transverse sealing device 15 bonds two opposing surfaces of the film tube FT to make the bags W. The transverse sealing device 15 has a first sealing jaw 56 and a second sealing jaw 57. The first sealing jaw 56 and the second sealing jaw 57 can each move in a horizontal direction H toward or away from each other. In addition, the first sealing jaw 56 and the second sealing jaw 57 can also move in a vertical direction V.

(2-6) Control Unit 16

The control unit 16 controls the motor of the pull-down belts 13, the longitudinal sealing device 14, the transverse sealing device 15, and other actuators, and also processes signals from various sensors. The control unit 16 comprises a processor, for example.

(3) Detailed Configuration of Transverse Sealing Device 15

FIG. 2 shows the detailed configuration of the transverse sealing device 15. The transverse sealing device 15 has a frame base 51, a horizontal moving frame 52, a slide member 53, a horizontal moving device 54, a vertical moving device 55, the first sealing jaw 56, and the second sealing jaw 57.

(3-1) Frame Base 51

The frame base 51 shown in FIG. 2 has a first side frame 61, a second side frame 62, a first coupling member 63, a second coupling member 64, and plural guides 65. The first coupling member 63 and the second coupling member 64 both couple the first side frame 61 and the second side frame 62 to each other. Each of the guides 65 is secured to the first side frame 61 or the second side frame 62.

(3-2) Horizontal Moving Frame 52

The horizontal moving frame 52 has a square shape. The horizontal moving frame 52 is movable in the horizontal direction H with respect to the frame base 51. The horizontal moving frame 52 has a first slide rod 71, a second slide rod 72, a first base member 73, and a second base member 74. The first slide rod 71 is disposed along the first side frame 61. The second slide rod 72 is disposed along the second side frame 62. To both ends of the first slide rod 71 and the second slide rod 72, the first base member 73 and the second base member 74 are secured respectively. The first slide rod 71 and the second slide rod 72 are slidably supported by the plural guides 65 of the frame base 51.

(3-3) Slide Member 53

The slide member 53 bridges the first slide rod 71 and the second slide rod 72. Both ends of the slide member 53 are provided with sliders 75. The sliders 75 can slide in the horizontal direction H with respect to the first slide rod 71 and the second slide rod 72.

(3-4) Horizontal Moving Device 54

The horizontal moving device 54 has a horizontal moving motor 58 and a horizontal link mechanism 80.

The horizontal moving motor 58 generates power that moves the first sealing jaw 56 and the second sealing jaw 57 in the horizontal direction H. The horizontal moving motor 58 can rotate in both a forward direction and a reverse direction.

The horizontal link mechanism 80 transmits the power of the horizontal moving motor 58 to the horizontal moving frame 52 and the slide member 53. As shown in FIG. 2, the horizontal link mechanism 80 has a first link 81, a second link 82, and a third link 83. To the center of the first link 81, a rotating shaft 58a is secured. The rotating shaft 58a is rotated by the horizontal moving motor 58. The rotating shaft 58a can rotate in both a forward direction and a reverse direction. The rotating shaft 58a can be a shaft directly coupled to a rotor of the horizontal moving motor 58. Alternatively, the rotating shaft 58a can be a shaft rotated by a gear box or a belt attached to the horizontal moving motor 58. In accompaniment with the rotation of the rotating shaft 58a, the first link 81 also rotates. To both end portions of the first link 81, the second link 82 and the third link 83 are rotatably coupled respectively. The second link 82 is coupled to the second base member 74. The third link 83 is coupled to the slide member 53.

(3-5) First Sealing Jaw 56 and Second Sealing Jaw 57

The first sealing jaw 56 is installed on the first base member 73 of the horizontal moving frame 52. The second sealing jaw 57 is installed on the slide member 53. The first sealing jaw 56 and the second sealing jaw 57 are provided with heaters not shown in the drawings. Moreover, at least one of the first sealing jaw 56 and the second sealing jaw 57 is provided with a movable knife not shown in the drawings.

In FIG. 2, the first sealing jaw 56 and the second sealing jaw 57 are in positions near each other. When the rotating shaft 58a rotates a predetermined angle, the horizontal link mechanism 80 switches to the arrangement shown in FIG. 3. In FIG. 3, the first sealing jaw 56 and the second sealing jaw 57 are in positions apart from each other. When, in the state in FIG. 3, the rotating shaft 58a rotates in the reverse direction, the horizontal link mechanism 80 returns to the arrangement shown in FIG. 2.

(3-6) Vertical Moving Device 55

Figure 4:
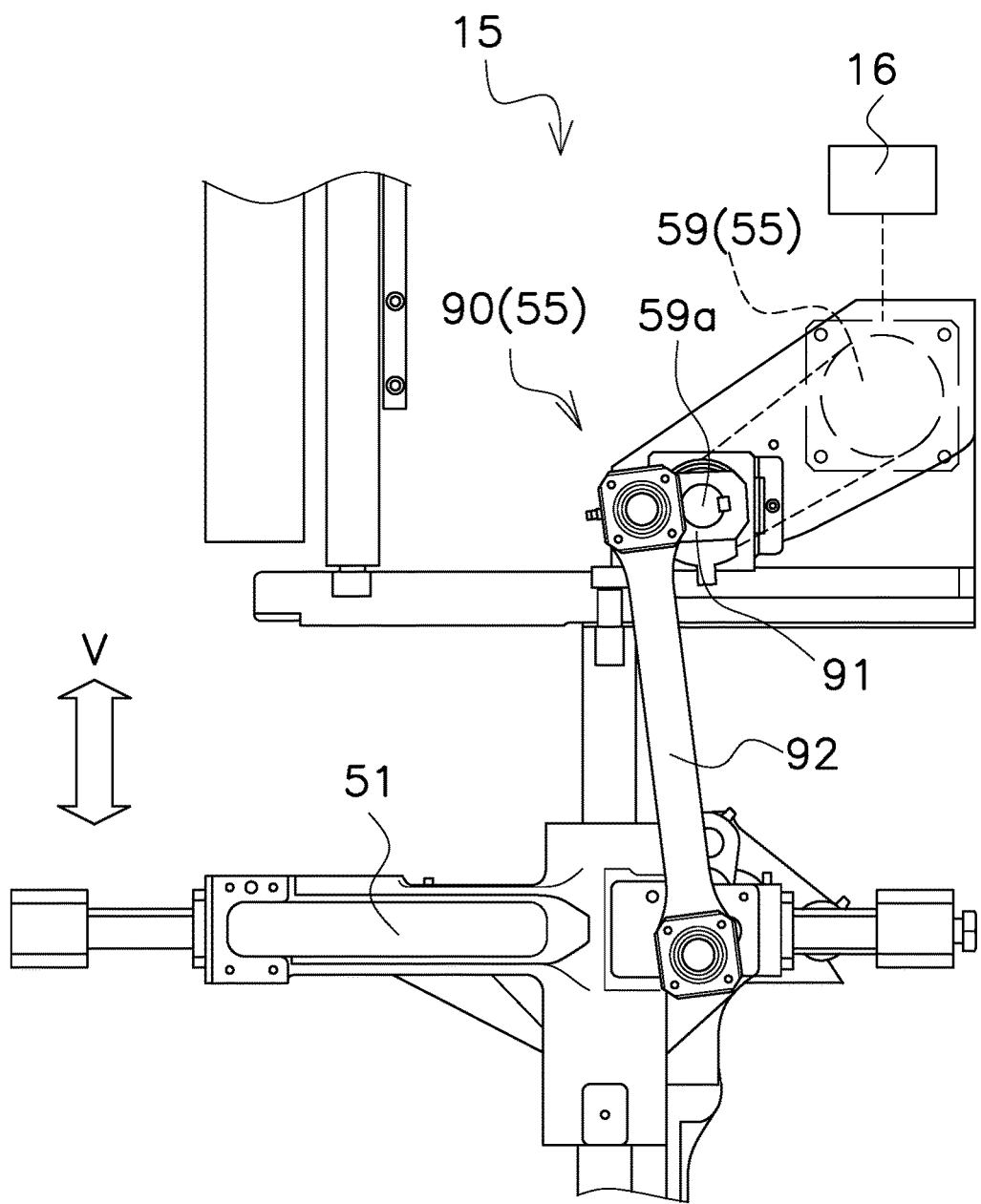
FIG. 4 is a side view showing the transverse sealing device 15.

The vertical moving device 55 shown in FIG. 4 has a vertical moving motor 59 and a vertical link mechanism 90.

The vertical moving motor 59 generates power for moving the first sealing jaw 56 and the second sealing jaw 57 in the vertical direction V. The vertical moving motor 59 can rotate in both a forward direction and a reverse direction.

The vertical link mechanism 90 transmits the power of the vertical moving motor 59 to the frame base 51. The vertical link mechanism 90 has a first link 91 and a second link 92. To one end of the first link 91, a rotating shaft 59a is secured. The rotating shaft 59a is rotated by the vertical moving motor 59. The rotating shaft 59a can rotate in both a forward direction and a reverse direction. The rotating shaft 59a can be a shaft directly coupled to a rotor of the vertical moving motor 59. Alternatively, the rotating shaft 59a can be a shaft rotated by a gear box or a belt attached to the vertical moving motor 59. In accompaniment with the rotation of the rotating shaft 59a, the first link 91 also rotates. To the other end of the first link 91, the second link 92 is rotatably coupled. The second link 92 is coupled to the first side frame 61 or the second side frame 62 of the frame base 51. When the rotating shaft 59a rotates, the frame base 51 moves in the vertical direction V, and therefore the first sealing jaw 56 and the second sealing jaw 57 move up and down.

(4) Operation of First Sealing Jaw 56 and Second Sealing Jaw 57

Figure 5:
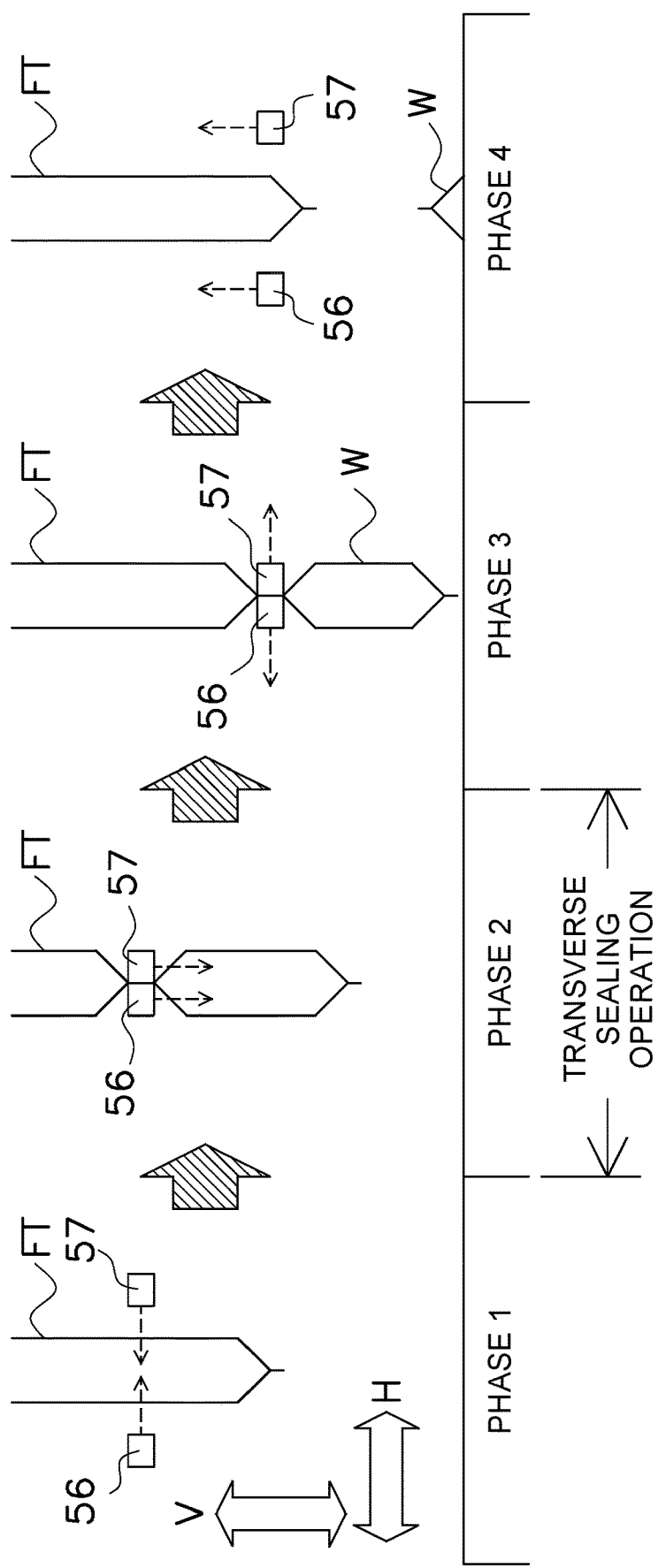
FIG. 5 is a schematic view showing the operation, in one cycle, of a first sealing jaw 56 and a second sealing jaw 57.

FIG. 5 shows the operation of the first sealing jaw 56 and the second sealing jaw 57. The period in which the transverse sealing operation is performed is called a cycle. One cycle comprises four phases, that is, a first phase to a fourth phase.

At the start of the first phase, the first sealing jaw 56 and the second sealing jaw 57 are apart from each other. In the first phase, the first sealing jaw 56 and the second sealing jaw 57 move in the horizontal direction H toward each other. When the first sealing jaw 56 and the second sealing jaw 57 start pressing the film tube FT, the first phase ends.

At the start of the second phase, the first sealing jaw 56 and the second sealing jaw 57 press the film tube FT. This signifies the start of the transverse sealing operation. Next, the first sealing jaw 56 and the second sealing jaw 57 strip the film tube FT by moving a predetermined distance downward in the vertical direction V faster than the conveyance speed of the film tube FT. Next, the first sealing jaw 56 and the second sealing jaw 57 apply heat to the film tube FT to make a transversely sealed portion in the bags W. Next, the knife provided in the first sealing jaw 56 or the second sealing jaw cuts the transversely sealed portion. The cutting of the transversely sealed portion signifies the end of the transverse sealing operation. With this, the second phase also ends. It will be noted that the conveyance of the film tube FT can also be stopped during the transverse sealing operation.

In the third phase, the first sealing jaw 56 and the second sealing jaw 57 at least move in the horizontal direction H away from each other. When the distance separating the first sealing jaw 56 and the second sealing jaw 57 reaches a maximum, the third phase ends.[0058] In the fourth phase, the first sealing jaw 56 and the second sealing jaw 57 move a predetermined distance upward in the vertical direction V. When the upward movement ends, the fourth phase ends.

(5) Operation of Vertical Link Mechanism 90

Figure 6:
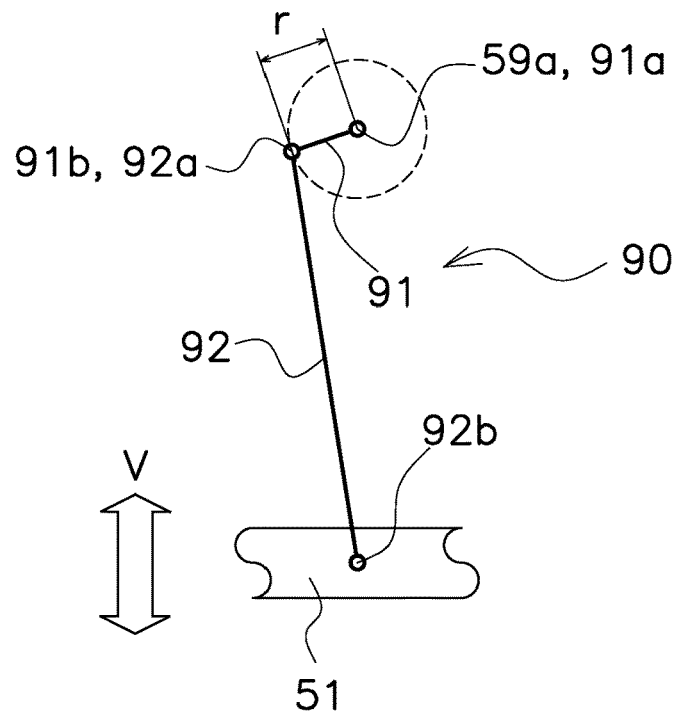
FIG. 6 is a schematic view of a vertical link mechanism 90.

FIG. 6 is a schematic view of the vertical link mechanism 90. The length of the first link 91 is a first link length r. The first link 91 has a first link first end 91a and a first link second end 91b. The second link 92 has a second link first end 92a and a second link second end 92b. The first link first end 91a is secured to the rotating shaft 59a. The first link second end 91b is coupled to the second link first end 92a. The second link second end 92b is coupled to the frame base 51. The rotation of the rotating shaft 59a moves the frame base 51 in the vertical direction V.

Figure 7:
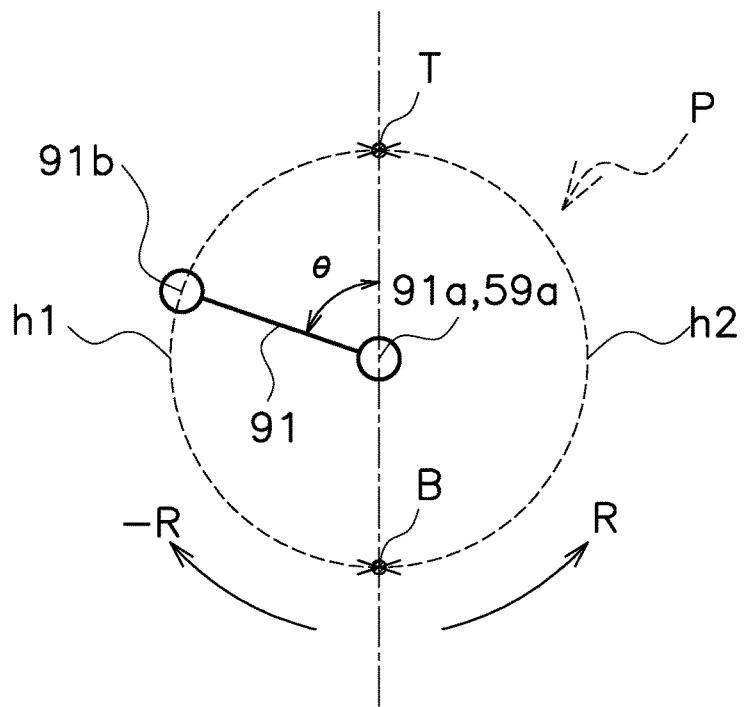
FIG. 7 is a schematic view of a first link 91 of the vertical link mechanism 90.

FIG. 7 is a schematic view of the first link 91 of the vertical link mechanism 90. The first link 91 can rotate in a forward direction R or a reverse direction —R as a result of the rotating shaft 59a rotating in the forward direction or the reverse direction. An angle θ of the first link 91 shown in FIG. 7 indicates the degree of rotation of the first link. When the first link 91 rotates in the forward direction R, the angle θ increases. A path P of the first link second end 91b follows a circle whose radius is the first link length r. An angle θ of 0° corresponds to a top dead center T. An angle θ of 180° corresponds to a bottom dead center B. The region of the circular path corresponding to an angle θ of 0° or more and less than 180° is a first half circle h1. The region of the circular path P corresponding to an angle θ of 180° or more and less than 360° is a second half circle h2.

(6) First Control and Second Control

The control unit 16 selectively implements one of first control and second control described below.

(6-1) First Control

The first control is control that forwardly rotates and reversely rotates the rotating shaft 59a during the time from the start of one transverse sealing operation to the start of the subsequent transverse sealing operation (i.e., during one cycle). FIG. 8 is a schematic diagram showing the operation of the first link 91 under the first control in two cycles.

At the start of the first phase of the first cycle, the first link second end 91b is in the first half circle h1. The angle $\theta$ of the first link 91 is set to an initial value $\theta_0$. The initial value $\theta_0$ exceeds at least 0°, and the first link second end 91b is below the top dead center T. The initial value $\theta_0$ is, for example, 30° or more and 90° or less. That is, the first link second end 91b at the start of the transverse sealing operation is positioned below the top dead center T by an amount corresponding to a rotation angle of 30° or more.

In the second phase of the first cycle, the first link 91 rotates in the forward direction R so that the angle $\theta$ reaches a value $\theta_1$. The value $\theta_1$ is less than at least 180°, and the first link second end 91b is above the bottom dead center B. The value $\theta_1$ is, for example, 135° or more and 150° or less. That is, the first link second end 91b at the end of the transverse sealing operation is positioned above the bottom dead center B by an amount corresponding to a rotation angle of 30° or more.

In the third phase of the first cycle, the first link 91 stops. At this time, the first sealing jaw 56 and the second sealing jaw 57 move away from each other. Alternatively, the first link 91, instead of stopping, rotates slightly further in the forward direction R. At this time, the first sealing jaw 56 and the second sealing jaw 57 move away from each other while moving in the conveyance direction of the film tube FT, that is, downward.

In the fourth phase of the first cycle, the first link 91 rotates in the reverse direction —R.

As described above, in the first control, the operation during one cycle includes both a rotation of the rotating shaft 59a in the forward direction R and a rotation of the rotating shaft 59a in the reverse direction —R.

In the second cycle, the first link 91 operates in exactly the same way as in the first cycle.

(6-2) Second Control

The second control is control that performs one of one transverse sealing operation and the subsequent transverse sealing operation with a forward rotation of the rotating shaft 59a and the other with a reverse rotation of the rotating shaft 59a. FIG. 9 is a schematic diagram showing the operation of the first link 91 under the second control in two cycles.

At the start of the first phase of the first cycle, the first link second end 91b is in the first half circle h1. The angle $\theta$ of the first link 91 is set to an initial value $\theta_0$. The initial value $\theta_0$ exceeds at least 0°, and the first link second end 91b is below the top dead center T. The initial value $\theta_0$ is, for example, 30° or more and 90° or less. That is, the first link second end 91b at the start of the transverse sealing operation is positioned below the top dead center T by an amount corresponding to a rotation angle of 30° or more.

In the second phase of the first cycle, the first link 91 rotates in the forward direction R so that the angle $\theta$ reaches a value $\theta_1$. The value $\theta_1$ is less than at least 180°, and the first link second end 91b is above the bottom dead center B. The value $\theta_1$ is, for example, 135° or more and 150° or less. That is, the first link second end 91b at the end of the transverse sealing operation is positioned above the bottom dead center B by an amount corresponding to a rotation angle of 30° or more.

In the third phase of the first cycle, the first link 91 rotates further in the forward direction R. At this time, the first sealing jaw 56 and the second sealing jaw 57 move away from each other while moving in the conveyance direction of the film tube FT, that is, downward.

In the fourth phase of the first cycle, the first link second end 91b moves to the second half circle h2. The first link 91 rotates further in the forward direction R.

At the start of the first phase of the second cycle, the first link second end 91b is in the second half circle h2. The angle $\theta$ of the first link 91 is set to an initial value $\theta_2$. The initial value $\theta_2$ is less than at least 360°, and the first link second end 91b is below the top dead center T. The initial value $\theta_2$ is, for example, 270° or more and 330° or less. That is, the first link second end 91b at the start of the transverse sealing operation is positioned below the top dead center T by an amount corresponding to a rotation angle of 30° or more.

In the second phase of the first cycle, the first link 91 rotates in the reverse direction —R so that the angle $\theta$ reaches a value $\theta_3$. The value $\theta_3$ at least exceeds 180°, and the first link second end 91b is above the bottom dead center B. The value $\theta_3$ is, for example, 210° or more and 225° or less. That is, the first link second end 91b at the end of the transverse sealing operation is positioned above the bottom dead center B by an amount corresponding to a rotation angle of 30° or more.

In the third phase of the second cycle, the first link 91 rotates further in the reverse direction —R. At this time, the first sealing jaw 56 and the second sealing jaw 57 move away from each other while moving in the conveyance direction of the film tube FT, that is, downward.

In the fourth phase of the first cycle, the first link second end 91b moves to the first half circle h1. The first link 91 rotates further in the reverse direction —R.

As described above, in the second control, a transverse sealing operation accomplished by a rotation of the rotating shaft 59a in the forward direction R and a transverse sealing operation accomplished by a rotation of the rotating shaft 59a in the reverse direction —R are alternately performed.

(7) Characteristics (7-1)

The control unit 16 can perform the first control and the second control. Consequently, there is greater flexibility in the operations that the bag-making and packaging machine 10 executes.

(7-2)

The vertical link mechanism 90 has the first link 91 and the second link 92. Consequently, the rotational force of the rotating shaft 59a can be transmitted by the first link 91 and the second link 92 to the first sealing jaw 56 and the second sealing jaw 57.

(7-3)

At the end of the transverse sealing operation, the first link second end 91b is not positioned at the bottom dead center B. Consequently, the operation subsequent to the transverse sealing operation can be smoothly started.

(7-4)

At the start of the transverse sealing operation, the first link second end 91b is not positioned at the top dead center T. Consequently, the transverse sealing operation can be smoothly started.

(7-5)

At the start of the transverse sealing operation, the first link second end 91b is positioned above the bottom dead center B by an amount corresponding to a rotation angle of 30° or more. Consequently, the first sealing jaw 56 and the second sealing jaw 57 can move further downward at the end of the transverse sealing operation, so jamming of the film F that is conveyed can be inhibited.

(7-6)

At the start of the transverse sealing operation, the first link second end 91*b* is positioned below the top dead center T by an amount corresponding to a rotation angle of 30° or more. Consequently, speed in the vertical direction for the first sealing jaw 56 and the second sealing jaw 57 to perform a stripping operation can be ensured.

(7-7)

The forward rotation and the reverse rotation of the rotating shaft 59*a* are each executed once each for every two transverse sealing operations. Consequently, the frequency of switches between the forward rotation and the reverse rotation is small, so the transverse sealing operation can be quickly performed.

(7-8)

The first link second end 91*b* moves downward after the end of the transverse sealing operation. Consequently, jamming of the film F that is conveyed can be inhibited.

(7-9)

According to this configuration, the control unit is capable of executing both the first control and the second control. Consequently, control flexibility is improved.

REFERENCE SIGNS LIST

10: Bag-making and Packaging Machine
15: Transverse Sealing Device
16: Control Unit
51: Frame Base
56: First Sealing Jaw
57: Second Sealing Jaw
58: Horizontal Moving Motor
58*a*: Rotating Shaft
59: Vertical Moving Motor
59*a*: Rotating Shaft
80: Horizontal Link Mechanism
81: First Link
82: Second Link
83: Third Link
90: Vertical Link Mechanism
91: First Link
91*a*: First Link First End
91*b*: First Link Second End
92: Second Link
92*a*: Second Link First End
92*b*: Second Link Second End
B: Bottom Dead Center
F: Film
FT: Film Tube
H: Horizontal Direction
T: Top Dead Center
V: Vertical Direction
W: Bag
h1: First Half Circle
h2: Second Half Circle

The invention claimed is:

1. A bag-making and packaging machine comprising:
   sealing jaws that perform a transverse sealing operation;
   a horizontal moving device that moves the sealing jaws in a horizontal direction;
   a vertical moving device that moves the sealing jaws in a vertical direction; and
   a control unit,
   wherein the vertical moving device includes
      a rotating shaft configured to rotate forwardly and rotate reversely to cause the sealing jaws to move up and down in the vertical direction,
      a motor that rotates the rotating shaft forwardly and reversely, and
      a link mechanism that transmits rotational force of the rotating shaft to the sealing jaws to move the sealing jaws up and down in the vertical direction, and
   the control unit is configured to selectively perform
      first control that forwardly rotates and reversely rotates the rotating shaft during a period of time from a start of the transverse sealing operation to a start of a subsequent transverse sealing operation; and
      second control that performs one of the transverse sealing operation and the subsequent transverse sealing operation with a forward rotation of the rotating shaft and another with a reverse rotation of the rotating shaft.

2. The bag-making and packaging machine according to claim 1, wherein
   the link mechanism includes a first link and a second link,
   the first link has a first link length, and has a first link first end coupled to the rotating shaft and a first link second end coupled to the second link,
   the second link has a second link first end coupled to the first link and a second link second end coupled to the sealing jaws or a support body that supports the sealing jaws, and
   the first link second end moves in a region on a circle whose radius is the first link length, the circle having a top dead center, a bottom dead center, a first half circle interconnecting the top dead center and the bottom dead center, and a second half circle opposite to the first half circle.

3. The bag-making and packaging machine according to claim 2, wherein the first link second end at an end of the transverse sealing operation is positioned above the bottom dead center without being positioned at the bottom dead center.

4. The bag-making and packaging machine according to claim 2, wherein the first link second end at the start of the transverse sealing operation is positioned below the top dead center without being positioned at the top dead center.

5. The bag-making and packaging machine according to claim 2, wherein the first link second end at an end of the transverse sealing operation is positioned above the bottom dead center by an amount corresponding to a rotation angle of 30° or more.

6. The bag-making and packaging machine according to claim 2, wherein the first link second end at the start of the transverse sealing operation is positioned below the top dead center by an amount corresponding to a rotation angle of 30° or more.

7. The bag-making and packaging machine according to claim 2, wherein
   the control unit performs the second control, and
   the first link second end is positioned in one of the first half circle and the second half circle at an end of the transverse sealing operation, and thereafter passes through the bottom dead center to move to another of the first half circle and the second half circle.

8. The bag-making and packaging machine according to claim 1, wherein after an end of the transverse sealing operation, the sealing jaws move downward at least once.

9. The bag-making and packaging machine according to claim 1, wherein the control unit selectively performs one of the first control and the second control.

* * * * *